(12) United States Patent
Pereira

(10) Patent No.: US 10,165,516 B2
(45) Date of Patent: Dec. 25, 2018

(54) SYSTEMS AND METHODS FOR SWITCHED PROTOCOL WIRELESS CONNECTION

(71) Applicant: Silicon Laboratories Inc., Austin, TX (US)

(72) Inventor: Vitor M. Pereira, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 103 days.

(21) Appl. No.: 15/196,523

(22) Filed: Jun. 29, 2016

(65) Prior Publication Data

US 2018/0007634 A1 Jan. 4, 2018

(51) Int. Cl.
*H04W 52/02* (2009.01)
*H04W 84/12* (2009.01)

(52) U.S. Cl.
CPC ........ *H04W 52/0264* (2013.01); *H04W 84/12* (2013.01); *Y02D 70/10* (2018.01)

(58) Field of Classification Search
None
See application file for complete search history.

(56) References Cited

U.S. PATENT DOCUMENTS

| 8,094,597 B1 * | 1/2012 | Chhabra | ........... H04W 52/0235 370/311 |
| 9,326,094 B2 | 4/2016 | Johnson et al. | |
| 9,826,482 B2 * | 11/2017 | Park | .................. H04W 52/0229 |
| 2004/0113747 A1 * | 6/2004 | Kelcourse | ................. H01P 1/15 337/167 |
| 2013/0301420 A1 * | 11/2013 | Zhang | ................. H04W 76/048 370/241 |
| 2014/0106677 A1 * | 4/2014 | Altman | ............... H04B 1/3827 455/41.2 |
| 2016/0381636 A1 * | 12/2016 | Park | .................. H04W 52/0229 370/311 |

FOREIGN PATENT DOCUMENTS

WO   WO-2017110347 A1 *  6/2017  ......... H04N 5/23203

* cited by examiner

*Primary Examiner* — Robert C Scheibel
(74) *Attorney, Agent, or Firm* — Egan Peterman Enders Huston

(57) ABSTRACT

Systems and methods are provided that may be implemented to selectively enable relatively higher data throughput and higher power WiFi bidirectional wireless protocol capability during times of system wireless activity, and to selectively disable the WiFi bidirectional wireless protocol and enable relatively lower data throughput and lower power wireless protocol capability during the absence of such system wireless activity. The systems and methods may be implemented to enable bi-directional wireless communication and/or external activation of a wireless device both during times of wireless device activity and during times in which wireless device activity is absent and/or a wireless device is inactive and not transmitting.

21 Claims, 5 Drawing Sheets

SYSTEMS AND METHODS FOR SWITCHED PROTOCOL WIRELESS CONNECTION

FIELD

The disclosed systems and methods relate to wireless communication and, more particularly, to wireless connection protocols for wireless communication.

BACKGROUND

Microcontroller devices capable of relatively high throughput WiFi (IEEE 802.11x) wireless protocol communication have been employed to implement wireless communications on battery operated devices for Internet of Things (IoT) applications. In a typical IoT ecosystem there is seldom a requirement for WiFi communications on such a battery operated device. In many cases, the need for WiFi communications on a battery operated device is associated with response times of the order of seconds, i.e., a button is pressed on the device or a sensor is activated on the device and in a matter of a few seconds something needs to happen, for example, music is to be streamed, video is to be recorded/sent or other kind of data transfer is to occur. Thus, WiFi operation is rarely needed, and then only for a short period of time.

WiFi is a wireless protocol which requires a battery-operated WiFi device to remain actively associated with a wireless WiFi access point (AP) to enable bidirectional WiFi communication. Thus, the battery-operated WiFi device maintains an active WiFi connection while the battery operated device is in use, and dissociates with the AP at other times when the device is not in use in order to reduce power consumption. To reduce power consumption, the wireless association between the device and a wireless access point (AP) is stopped, and all wireless communication-related hardware is shut down on the device. Thus, disassociating with the AP is an action taken by the application layer to stop using WiFi and to shut down the radio. Drawbacks of employing this approach to reduce power in conventional WiFi operation battery operated devices include long response time due to the need for the battery operated device to re-associate with the AP before sending data. This may be of issue where faster response times are desired or needed for particular device operation.

Other drawbacks of temporarily dissociating with the AP include the limitation of single direction access from the battery operated device. This means that the battery operated WiFi device can request a wireless connection to the AP, and then send information to the WiFi network. However, a wireless connection to the device cannot be established in the opposite direction from the AP side while the battery operated device is not associated because all the WiFi wireless communication hardware in the device is shutdown at this time. This single direction access characteristic limits the capabilities of many IoT applications. For example, an event occurring at a battery operated IoT device (such as motion detected by a surveillance camera) is capable of triggering wireless reconnection to the AP so that video information can be sent from the device over the network. But on demand usage of the camera cannot be triggered from the AP side by a user because the AP side cannot request a connection to the device while its WiFi communication hardware is shutdown.

WiFi wireless communication protocol includes a beacon based Low power mode option that utilizes delivery traffic identification (DTIM) and traffic identification map (TIM). This WiFi Low power mode allows the device hardware to stay connected with the AP by only monitoring the wireless communication medium at pre-determined beacon times, mainly at the DTIMs that cover broadcast and multicast messages. This allows the device to have informationremain associated, and also to send and receive data to the AP. The beacons are spaced by hundreds of milliseconds (300 ms in the lowest commonly used duty cycle case). However, this results in a level of activity that is at least one order of magnitude higher than that required by an application that has a response time in the order of seconds. Thus, using WiFi wireless protocol for a surveillance camera, doorbell camera or other similar battery operated device either results in limited single direction access (while there is no association with the AP) or relatively large power consumption and battery drain.

SUMMARY

Disclosed herein are systems and methods that may be implemented in one embodiment to enable the coexistence of relatively higher data throughput and higher power WiFi wireless protocol capability together with relatively lower data throughput and lower power wireless protocol capability on the same wireless device. In one exemplary embodiment, the disclosed systems and methods may be advantageously implemented on a battery-powered wireless device, apparatus or circuit's to reduce power consumption by selectively enabling operation of relatively higher data throughput and higher power WiFi wireless protocol on demand and only during active wireless system operation while selectively disabling the WiFi wireless protocol and at the same time enabling operation of a relatively lower data throughput and lower power second wireless protocol during absence of an intermittent or periodic wireless system activity (e.g., such as during wireless device standby mode). In such an embodiment, bi-directional wireless communication and/or external activation of the battery-powered wireless system may be enabled during any of these active and non-active modes (e.g., such as during each of active and standby wireless device operation modes). This is in contrast to a conventional Wi-Fi wireless link operation employed for a battery-powered wireless device, which does not allow wireless communication battery power consumption to be reduced without disabling bi-directional communication and external activation capabilities of the WiFi wireless link during a device standby mode.

In one exemplary embodiment, a battery operated wireless system may be configured to selectively utilize an Institute of Electrical and Electronics Engineers (IEEE) 802.11-based (or 802.11x) WiFi wireless communication protocol in an on-demand fashion and only when it is needed to achieve relatively high bidirectional wireless data throughput for data exchange with other WiFi-based device/s when the battery-operated wireless system enters an active data transmission mode (e.g., when the system is implemented as a device that is internally activated to transmit collected wireless data from the battery operated device), and to then switch to a relatively lower data throughput wireless protocol (i.e., that consumes less power than the WiFi wireless communication protocol) for bidirectional communication with other wireless devices when the battery operated system enters a lower power operation mode such as standby mode where no data is to be transmitted from the wireless system. In this way, the battery operated system may be configured to switch from the WiFi wireless communication protocol to a relatively lower data throughput wireless protocol (e.g., such as BLE) after ending association with a WiFi AP switch. This operation in the relatively lower data throughput wireless protocol allows the battery operated system to be wirelessly contacted and externally activated by a user via the relatively lower data throughput wireless protocol.

Examples of relatively lower power and data throughput wireless protocols that may be employed in the practice of the disclosed systems and methods include, but are not limited to, lower duty cycle wireless protocols such as Bluetooth Low Energy (BLE), ZigBee, Zwave, and other relatively lower power narrow bandwidth wireless protocol standards having lower power consumption than the implemented WiFi wireless communication protocol. In this regard, a relatively lower powered wireless protocol may not only have a reduced duty-cycle but may also employ relatively simpler and lower power modulation schemes (e.g., such as Gaussian frequency shift keying "GFSK") when compared with the relatively higher power schemes such as the relatively high bandwidth Orthogonal Frequency Division Modulation (OFDM) used in WiFi that requires a fast Fourier transform (FFT) engine.

In one exemplary embodiment, current drawn in continuous receive mode for a relatively lower power and data throughput wireless protocol may be less than or equal to about 10 milliamps and current drawn in a continuous receive mode for a relatively higher power and data throughput wireless protocol may be greater than or equal to about 50 milliamps. In a further embodiment, current drawn in a continuous receive mode for a relatively lower power and data throughput wireless protocol such as 2.4 GHz BLE or ZigBee is about 4 milliamps, while current drawn in a continuous receive mode for a relatively higher power and data throughput wireless protocol such as 2.4 GHz WiFi is about 80 milliamps. In a further exemplary embodiment, a reduced duty cycle may be utilized to further reduce power consumption for a relatively lower power wireless protocol, e.g., a 300 millisecond sleep cycle for relatively higher power WiFi wireless protocol will consume about 200 times more current than a 3 second sleep cycle for relatively lower power BLE or ZigBee wireless protocol over the same period of time.

In a further embodiment, the disclosed systems and methods may be implemented using a wireless radio module that is fabricated on a single integrated circuit semiconductor die (e.g., such as a single microcontroller chip), although multiple die and/or multiple circuit systems are also possible. In yet a further embodiment, frequency coexistence may be employed to allow the relatively higher data throughput wireless protocol (WiFi) and the relatively lower data throughput wireless protocol (e.g., BLE) to share most of the same wireless radio frequency (RF) front end circuitry as well as the same antenna. Thus, an integrated circuit or microcontroller may be advantageously provided in one exemplary embodiment that implements most or all of the radio receiver and transmitter features for both the relatively higher data throughput wireless protocol standard and the relatively lower data throughput wireless protocol standard on a single integrated circuit die.

In one embodiment, the disclosed systems and methods may be utilized for controlling wireless protocol operation in any wireless system application that uses battery power to maintain wireless connection for small time windows that are largely spaced in time (e.g., lower duty cycle) to quickly transmit a large amount of data. Examples of such wireless system applications include, for example, a real time wireless sensor or data collection system such as a battery operated surveillance system having a camera. Other examples of such wireless system applications include, but are not limited to, battery operated systems that store a relatively large amount of data in memory that needs only to be transmitted sporadically upon activation by occurrence of a certain event or upon request from a recipient device. One example is a BLE battery-powered beacon device having a book, photos or movie (or video clip) stored in electronic format on memory of the beacon device. In such an example, the beacon device may advertise using a relatively lower power protocol (e.g., BLE) until a connection is established via the relatively lower power protocol with a requesting recipient wireless device of interest, such as a cell phone. Once the relatively lower power protocol connection is established and the request for the book, photos or movie is made, the battery-powered beacon may switch to Wi-Fi, connect with the recipient device (e.g., via a Mini-AP WiFi bridge device or via WiFi direct connection to the requesting device) and then transmit the book, photos or movie to the recipient device via WiFi wireless protocol. Such a wireless beacon device may be deployed, for example, in geographic areas that do not have cell tower coverage such that large amounts of information and data cannot be simply downloaded to a cell phone from the Internet.

In one respect, disclosed herein is a wireless system, including: at least one antenna; at least one bidirectional wireless data communication path coupled to the antenna; and at least one processor or programmable logic device (PLD) coupled to provide output data to the at least one bidirectional wireless data communication path. The at least one processor or PLD may be configured to: execute at least one application to perform at least one intermittent or periodic activity to produce the output data, selectively enable a bidirectional IEEE 802.11-based WiFi first wireless communication protocol to transmit the produced output data to one or more external wireless devices using the WiFi first wireless communication protocol, and then selectively disable the WiFi first wireless communication protocol after transmitting the produced output data while using a second and different bidirectional wireless communication protocol that consumes relatively less operating power than does the WiFi first wireless communication protocol to communicate with one or more external wireless devices while the WiFi first wireless communication protocol is disabled.

In another respect, disclosed herein is a method, including using at least one processor or programmable logic device (PLD) of a wireless system to: execute at least one application to perform at least one intermittent or periodic activity to produce output data; selectively enable a bidirectional IEEE 802.11-based WiFi first wireless communication protocol to transmit the produced output data to one or more external wireless devices using the WiFi first wireless communication protocol; and then selectively disable the WiFi first wireless communication protocol after transmitting the produced output data while using a second and different bidirectional wireless communication protocol that consumes relatively less operating power than does the WiFi first wireless communication protocol to communicate with one or more external wireless devices while the WiFi first wireless communication protocol is disabled.

In yet another respect, disclosed herein is a single-die integrated circuit, including: at least one bidirectional wireless data communication path configured to be coupled to at least one antenna; and at least one processor or programmable logic device (PLD) coupled to provide output data to the at least one bidirectional wireless data communication path. The at least one processor or PLD may be configured to: execute at least one application to perform at least one intermittent or periodic activity to produce the output data, selectively enable a bidirectional IEEE 802.11-based WiFi first wireless communication protocol to provide the produced output data to the antenna for transmission, and then selectively disable the WiFi first wireless communication protocol while using a second and different bidirectional wireless communication protocol that consumes relatively less operating power than does the WiFi first wireless communication protocol to provide data to the antenna and receive data from the antenna while the WiFi first wireless communication protocol is disabled.

DESCRIPTION OF ILLUSTRATIVE EMBODIMENTS

Figure 1:
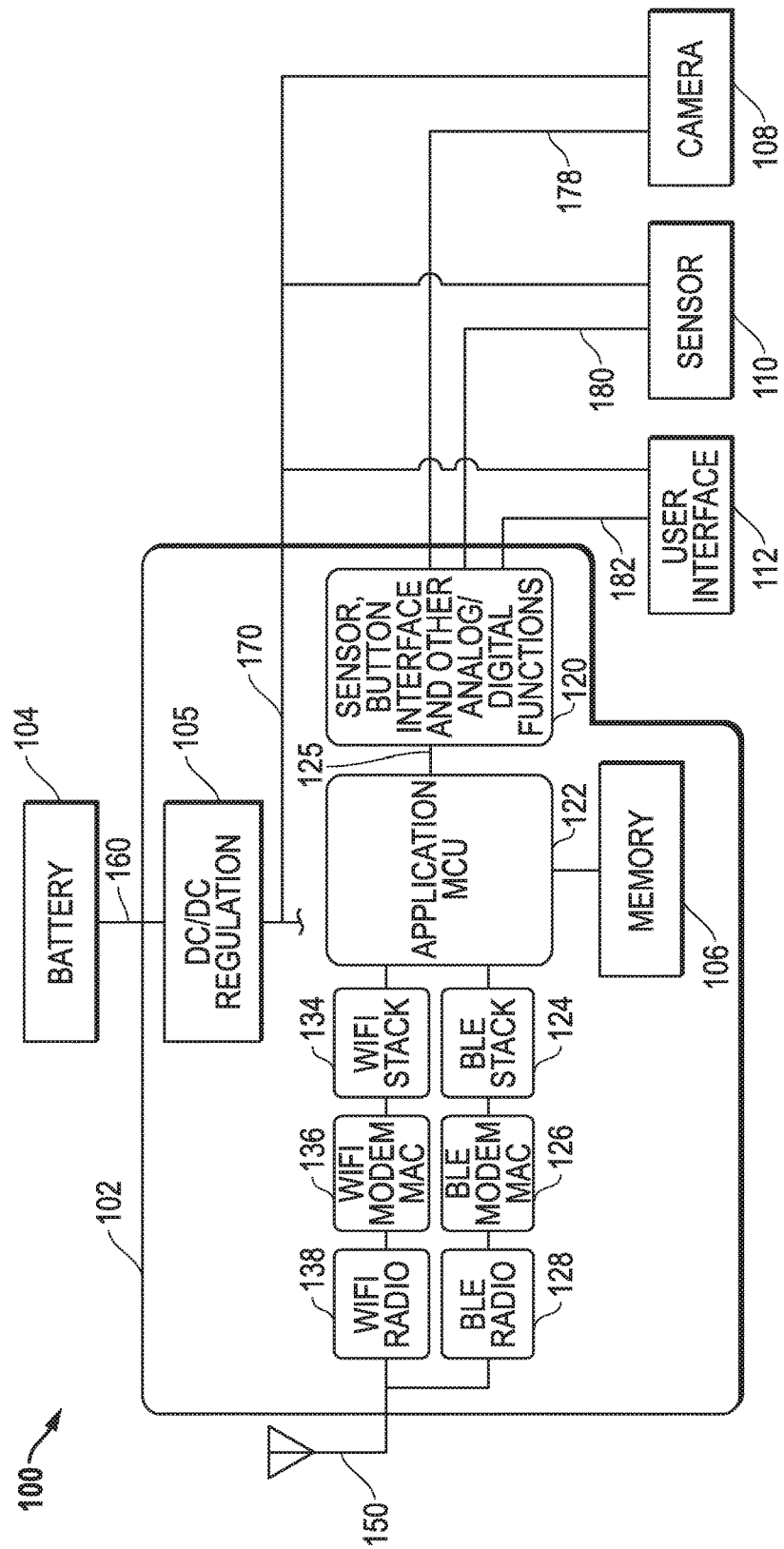
FIG. 1 illustrates a battery operated wireless device according to one exemplary embodiment of the disclosed circuitry and methods.

FIG. 1 illustrates one exemplary embodiment of a battery operated wireless system in the form of wireless device 100 as it may be configured to selectively utilize an IEEE 802.11x-based WiFi wireless communication protocol in an on-demand fashion for relatively higher data throughput bidirectional communication of information and data with other WiFi-based device/s, and to then change to a relatively lower power and relatively lower data throughput wireless protocol (e.g., BLE wireless communication protocol in this case) for bidirectional information and data exchange with other wireless devices when the battery operated device enters a lower power operation mode such as standby mode where no data is to be transmitted from the wireless device 100. Examples of suitable IEEE 802.11x-based WiFi wireless communication protocols include, but are not limited to, 802.11 legacy wireless protocol, as well as 802.11a, 802.11b, 802.11g, 802.11n, 802.11ac, 802.11ad, 802.11af, 802.11ah, 802.11ai, 802.11aj, 802.11aq, 802.11ax and 802.11ay wireless protocols. Further, although illustrated and described in relation to a relatively lower power and relatively lower data throughput BLE wireless communication protocol, it will be understood that in other embodiments other types of relatively lower power and relatively lower data throughput wireless protocols may be employed instead of BLE including, but not limited to, Classic Bluetooth, ZigBee, Zwave, and other relatively lower power narrow bandwidth wireless protocol standards having lower power consumption than the IEEE 802.11x-based WiFi wireless communication protocol of device 100.

In one exemplary embodiment, relatively higher data throughput wireless communication may be defined as greater than about 5 Mbs wireless data throughput measured after protocol overhead is removed, and relatively lower data throughput wireless communication may be defined as less than or equal to about 80 Kbs wireless data throughput measured after protocol overhead is removed. However, it will be understood that these data throughput ranges are exemplary only, and that in other embodiments relatively higher data throughput wireless communication may be less than 5 Mbs wireless data throughput after protocol overhead is removed, and/or relatively lower data throughput wireless communication may be greater than 80 Kbs wireless data throughput measured after protocol overhead is removed, as long as the data throughput of the relatively higher data throughput wireless communication is greater than the data throughput of the relatively lower data throughput wireless communication.

As shown in FIG. 1, battery operated wireless device 100 includes a radio module in the form of a RF system-on-chip (SOC) 102 that may be fabricated on a single semiconductor die, e.g., such as a single microcontroller chip with split cores. As shown RF SOC 102 includes an application controller 122 that may be coupled to receive conditioned digitals from interface circuitry that correspond to analog and/or digital input signals 178, 180 and 182 that are received from respective input devices via interface circuitry 120. Examples of such input devices include, but are not limited to, video camera 108, environmental or condition sensor 110 (e.g., such as ultrasonic or infrared motion detector, smoke detector, vibration detector, temperature sensor, barometric pressure or other pressure sensor, humidity sensor, sound sensor or microphone, etc.), and user interface device 112 such as mechanical push button such as doorbell, touch pad, graphical user interface (GUI), etc. Interface circuitry 120 may include any suitable circuitry (e.g., analog front end, analog-to-digital converter/s, etc.) for transforming and/or conditioning input signals 178, 180 and 182 into a suitable digital input signal format for application controller 122. In one embodiment signals 178, 180 and 182 may be provided via wired conductors. However, it will be understood that it is possible in another exemplary embodiment that analog and/or digital input signals from one or more input device/s may be provided wirelessly, e.g., via an additional intermediary SOC having wired connection to input devices/sensors 108, 110 and/or 112 and then wirelessly connected to SOC 102 to provide data provided from these sensors to SOC 102.

It will be understood that the illustrated number and types of input devices and corresponding input signals shown in FIG. 1 are exemplary only, and that additional or fewer number of input signals may be provided from additional or fewer number of the same or different types of input devices. Other types of input devices include, but are not limited to, any type of devices configured to produce an input signal representative of monitored conditions external to device 100 (e.g., such temperature, humidity, barometric pressure, wind speed, sunlight, sounds, smoke or $CO_2$ content, etc.), live or recorded audio or video images, external human user input, etc. It will also be understood that in one embodiment the illustrated components of wireless device 100 may be integrated together as a system, i.e., as part of a single self-contained battery-operated device the components of which may, for example, be mounted on a common chassis and partially or completed contained within an enclosure or cover.

As further shown in FIG. 1, application controller 122 is configured to receive, read and process the conditioned digital signals 125 to produce output data based thereon for wireless transmission from antenna 150 on demand via either one of a bidirectional WiFi data communication path that includes WiFi stack 134, WiFi Modem (MAC) 136 and WiFi radio 138 (e.g., including one or more power amplifiers, low noise amplifiers, frequency synthesizers, etc.); or a bidirectional BLE data communication path that includes BLE stack 124, BLE Modem (MAC) 126 and BLE radio 128 (e.g., including one or more power amplifiers, low noise amplifiers, frequency synthesizers, etc.). In one embodiment, bidirectional WiFi data communication path may include a WiFi transceiver and bidirectional BLE data communication path may include a BLE transceiver.

In one exemplary embodiment application controller 122 and interface circuitry 120 may be implemented by a first core of a split-core RF SOC 102, while components of WiFi and BLE data communication paths may be implemented on a second and different core of the split-core RF SOC 102. In one embodiment, application controller 122 may execute at least one application (e.g., such as doorbell camera, motion detection, temperature sensor, etc.) to receive and process the conditioned digital signals 125 (e.g., that is based on input signals 178, 180 and/or 182) to produce output data (e.g., such as temperature data, detected movement notification signals, etc.).

Still referring to FIG. 1, application controller 122 is shown coupled to optional integrated non-volatile and/or volatile memory (e.g., DRAM and/or NVRAM) 106 which may be present, for example, for storing data or information received from input devices 108, 110, 112, as well as programming information, configuration information, or any other information for use by application controller 122 during operation of wireless device 100. Also shown is battery 104 that is coupled to provide unregulated power 160 to integrated DC/DC voltage regulator 105 (e.g., switched or non-switched) that in this exemplary embodiment supplies power of regulated voltage to various integrated components of SOC 102 as well as coupled input devices 108, 110 and 112 of wireless device 100 via one or more power buses 170. It will be understood that battery 104 may be a replaceable battery, or may be a rechargeable battery (e.g., lithium ion battery, nickel cadmium battery, etc.) in which case optional battery charging control circuitry (not shown) may be present, e.g., for receiving temporary battery charging current from an external AC adapter. It will also be understood that the disclosed systems and methods may also be implemented with non-battery powered (e.g., mains-powered) wireless devices having a backup battery that is utilized to keep the device 100 operating during occurrence of a power-outage (e.g., such as for security applications utilizing cameras and other sensors for security monitoring purposes). Examples of such a non-battery powered wireless device would include a wireless device 100 or 200 in which DC/DC regulation circuitry 105 is replaced by internal or external AC/DC regulation circuitry that receives AC power directly from AC mains.

Figure 2:
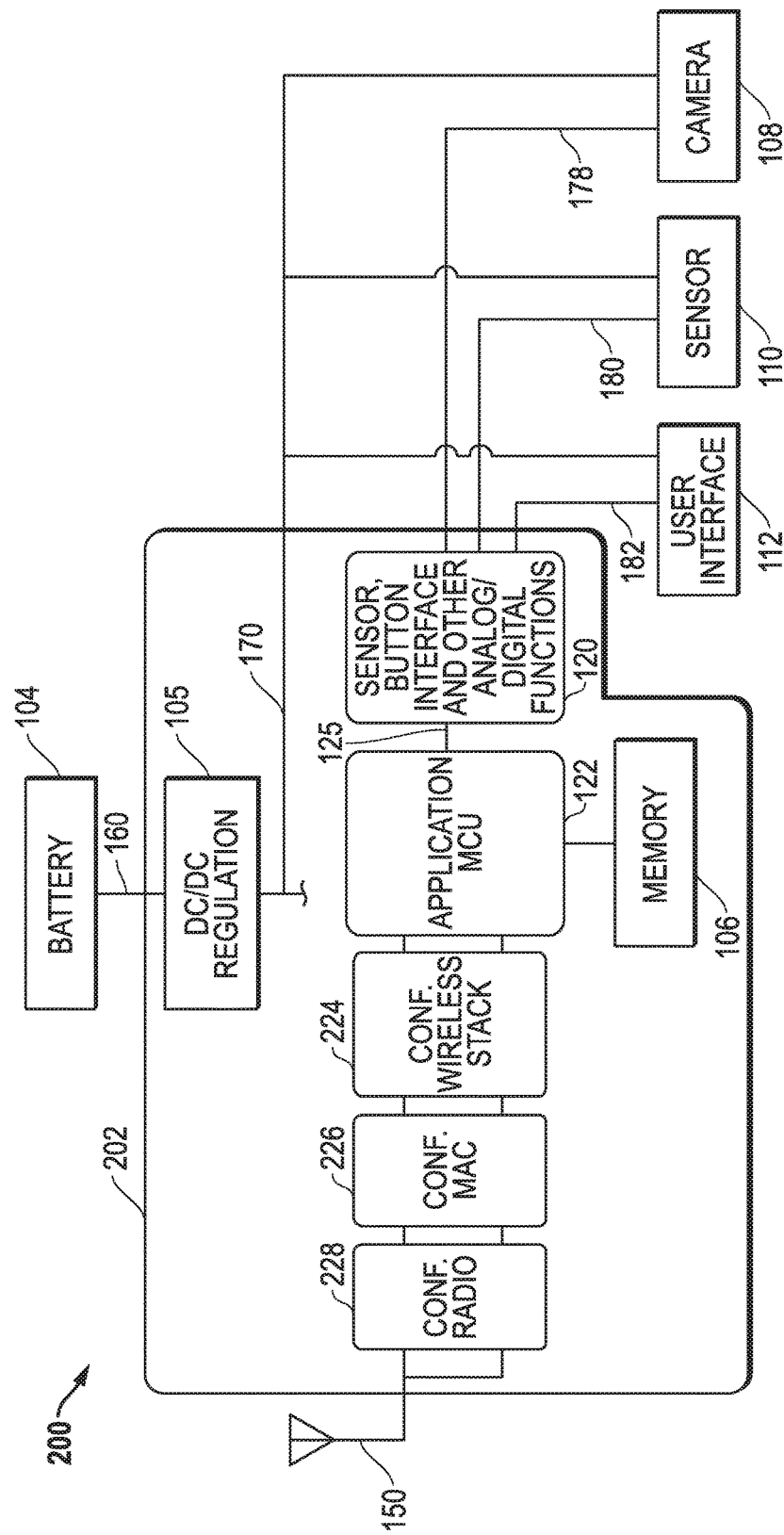
FIG. 2 illustrates a battery operated wireless device according to one exemplary embodiment of the disclosed circuitry and methods.

FIG. 2 illustrates one alternative embodiment of a battery operated wireless system in the form of a wireless device 200 similar in components and operation to wireless device 100 of FIG. 1, with the exception that it includes a radio module in the form of a RF SOC 202 that employs a single configurable bidirectional wireless data communication path that is reconfigurable in an on-demand fashion with optimum settings between a relatively higher power IEEE 802.11x-based WiFi wireless communication protocol and a relatively lower power and relatively lower data throughput wireless protocol such as BLE. The configurable wireless data communication path of wireless device 200 includes a configurable wireless stack 224, configurable wireless Modem (MAC) 226 and configurable radio 228 which are each controllable by application controller 122 to switch between the WiFi wireless communication protocol and the relatively lower power wireless protocol (e.g., BLE or other suitable relatively lower power and relatively lower data throughput wireless protocol). It will be understood that the wireless device embodiment 200 may operate in wireless communication environments in a similar manner described elsewhere herein for the wireless device embodiment 100.

Figure 3:
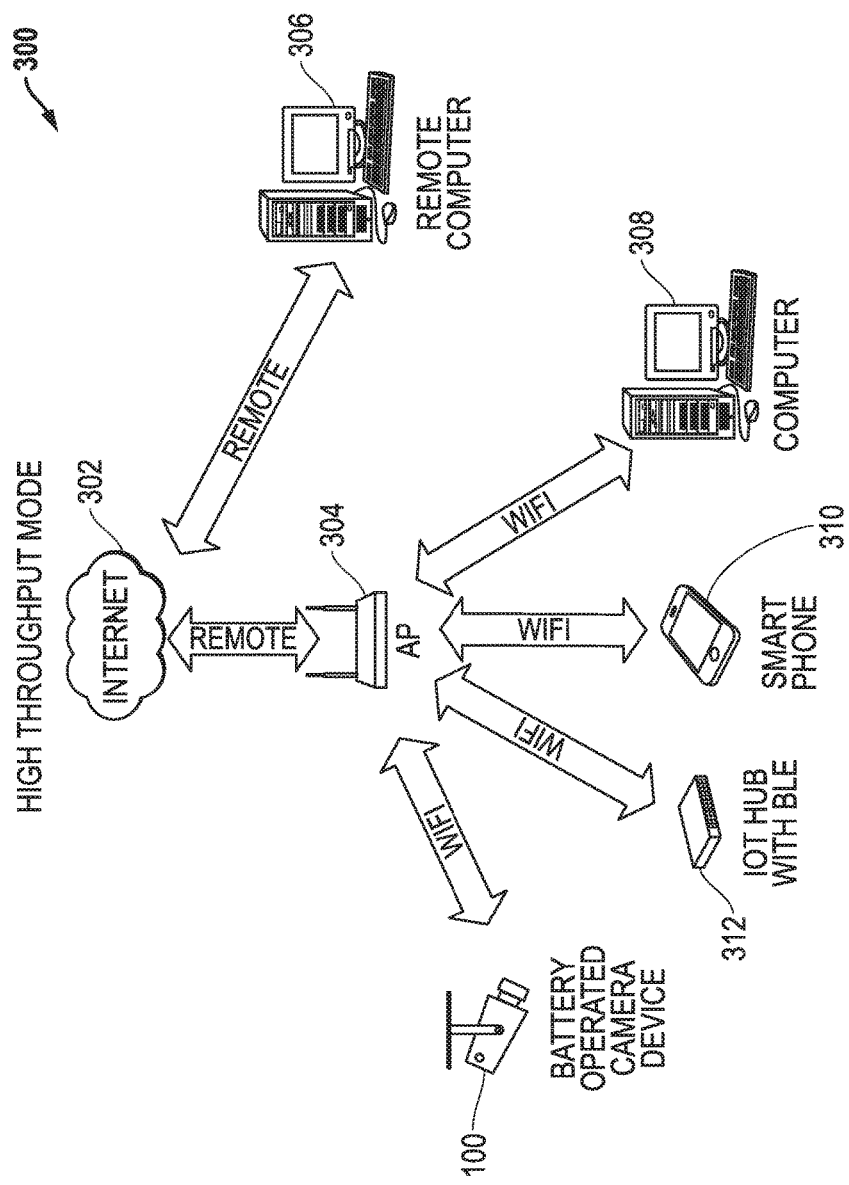
FIG. 3 illustrates a wireless communication environment according to one exemplary embodiment of the disclosed circuitry and methods.

FIG. 3 illustrates one embodiment of a wireless communication environment 300 in which battery operated wireless camera device 100 is active and operating in relatively high data throughput mode using relatively higher power IEEE 802.11x-based WiFi wireless communication protocol in a WiFi wireless local area network (WLAN). Wireless device 100 may transition from a relatively lower power and data throughput (e.g., BLE) standby operation mode to such a higher data throughput WiFi operation mode in response to receipt of an input signal received from one of input devices 108, 110 and/or 112 upon occurrence of an activation event (e.g., such as detected motion, detected pressing of doorbell button, etc.). Alternatively, wireless device 100 may transition from a relatively lower power and data throughput standby mode to an active higher data throughput WiFi mode in response to receipt of a relatively lower power and data throughput (e.g., BLE) wireless wake up activation communication received by wireless device 100 from an external device in a manner as further described in relation to FIG. 4.

As shown in FIG. 3, wireless camera device 100 is bidirectionally communicating directly with local WiFi wireless access point (AP) 304, and is capable of bidirectionally communicating through AP 304 with other local WiFi devices in the same WLAN such as smart phone 310, local desktop or notebook or tablet computer 308, etc. Wireless camera device 100 is also capable of bidirectionally communicating through AP 304 across the Internet 302 to remote devices such remote desktop or notebook or table computer 306, e.g., via wired remote connection such as Ethernet and fiber optic or cable, or other type remote connection such as wireless wide area network (WWAN), wireless metropolitan area network (WMAN), etc. Also shown present is a Bluetooth bridge in the form of Internet-of-Things (IOT) hub 312 that is capable of communicating with WiFi AP 304 and with wireless device 100 when wireless device 100 is in standby mode as will described in relation to FIG. 4. It will be understood that the illustrated type and number of local WiFi devices in FIG. 3 is exemplary only, and that fewer, additional, and/or different types of local WiFi devices may be present for communicating with wireless AP 304. Moreover, fewer, additional and/or different types of remote devices may communicate with AP 304 across Internet 302 or other type of network such as corporate Intranet.

In the high data throughput mode of FIG. 3, streaming video or streaming video and audio media data (e.g., real-time transport protocol "RTP", real data transport "RDT", etc.) may be transmitted as output data by active battery operated wireless device 100 to remote computer 306 and/or to any of local devices 308, 310, 312, through AP 304 via WiFi wireless communication protocol transmissions from wireless device 100 to AP 304. Since the WiFi connection between wireless device 100 and AP 302 in this mode is bidirectional, any of devices 306, 308, 310 and/or 312 may also send data (including commands and/or programming) to wireless device 100. In one embodiment, wireless device 100 may remain operating in the relatively higher power and higher data throughput WiFi mode of FIG. 3 for as long as device 100 is active, e.g., such as when application controller 122 of wireless device 100 transmitting output data to other external devices based on received input data from input devices 108, 110 and/or is receiving incoming wireless data (e.g., programming or commands) from such other external device/s.

Figure 4:
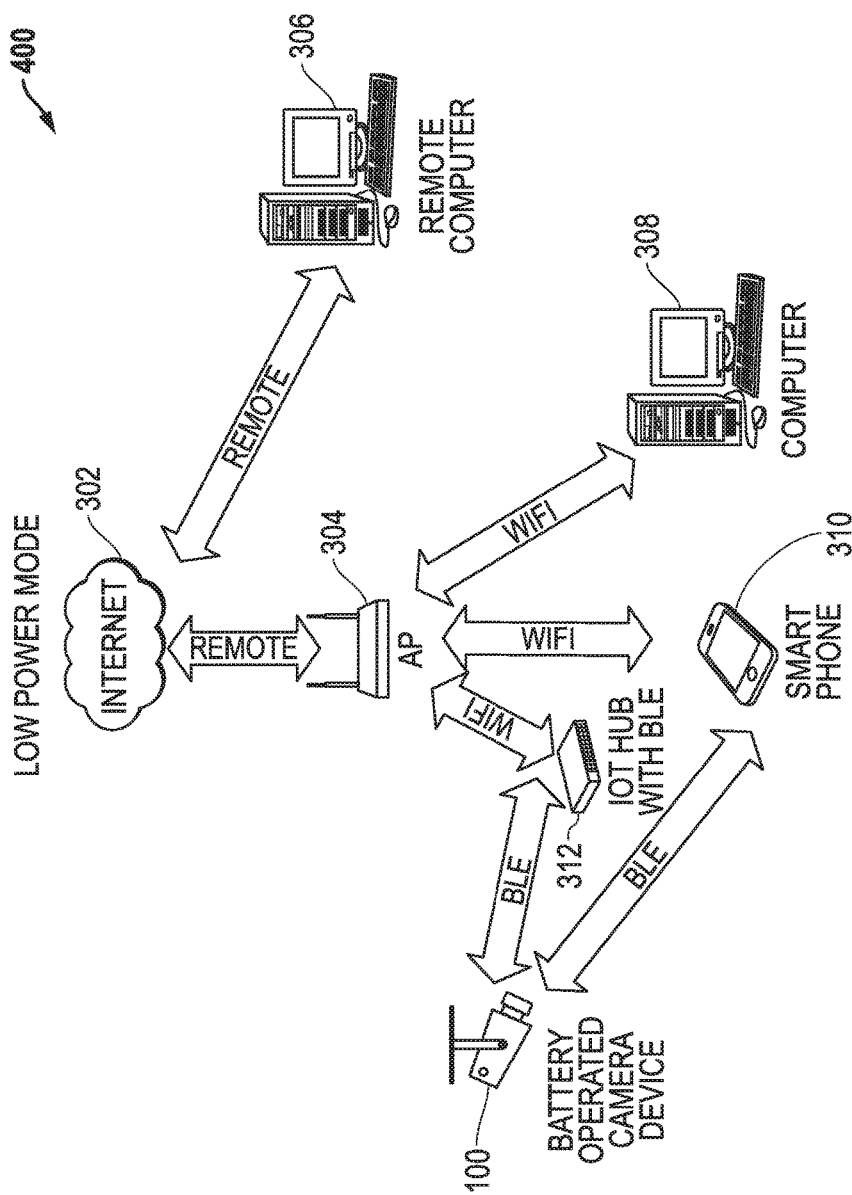
FIG. 4 illustrates a wireless communication environment according to one exemplary embodiment of the disclosed circuitry and methods.

FIG. 4 illustrates one embodiment of a wireless communication environment 400 in which battery operated wireless camera device 100 is now operating in relatively low data throughput mode using relatively lower power BLE wireless communication protocol. As described further herein in relation to FIG. 5, RF SOC 102 of wireless device 100 may be configured in one embodiment to switch from its internal bidirectional WiFi data communication path to its internal bidirectional BLE data communication path (and vice-versa) in response to expiration of a timer under the control of application controller 122, while wireless device 200 of FIG. 2 may reconfigure components of its internal bidirectional wireless data communication path from WiFi to BLE operation under the control of application controller 122. In one embodiment, application controller 122 may switch wireless device 100 to the relatively lower powered BLE wireless communication protocol whenever wireless device 100 goes into a power-saving standby mode, e.g., such as when application controller 122 of wireless device 100 has no output data to wirelessly transmit to other devices based on input signal/s received from input devices 108, 110 and/or 112. Power consumption from battery 104 is reduced during stand-by mode (as compared to conventional WiFi protocol standby mode) by virtue of using BLE or other relatively lower power wireless communication protocol that may have a reduced duty cycle compared to standby mode of WiFi wireless protocol. In this regard, a relatively lower powered wireless protocol may not only have a reduced duty-cycle but may also employ relatively simpler and lower power modulation schemes (e.g., such as Gaussian frequency shift keying "GFSK") when compared with the relatively higher power schemes such as the relatively high bandwidth Orthogonal Frequency Division Modulation (OFDM) used in WiFi that requires a fast Fourier transform (FFT) engine. In one embodiment, this may play a definitive role in reducing the power consumption of the relatively lower power wireless protocols.

As shown in FIG. 4, wireless camera device 100 is bidirectionally communicating directly with local BLE devices (in this case IOT hub 312 and/or smart phone 310). Wireless camera device 100 is also capable of bidirectionally communicating in this lower power mode through IOT hub 312 and/or smart phone 310 via WiFi wireless communication protocol with other WiFi devices in the WLAN (e.g., such as local computer 308) and/or with remote computer 306 via Internet 302. In one embodiment of the low data throughput mode of FIG. 4, in standby mode wireless device 100 may enter an advertising mode as the slave in a BLE connection with advertising intervals that may be set, for example, from about 0.02 seconds to about 10 seconds (or any other greater or lesser time suitable for a given application). In another embodiment, in standby mode wireless device 100 may become the master in a BLE connection and enter a scan mode in which the scan mode and scan interval are also configurable from about 2.5 microseconds to about 10 seconds (or any other greater or lesser time suitable for a given application). It will be understood that the selection of the time intervals may be application dependent, e.g., in order to reduce power consumption the duty-cycle may be reduced as much as possible while still allowing the desired response time for the application.

Still referring to FIG. 4, RF SOC 102 of wireless device 100 will remain in BLE standby mode until it receives a wake up activation communication from an in-range BLE-capable device, such as smart phone 310 or IOT hub 312. In the case of BLE, a wakeup activation communication may be, for example, a scan request or connection request packet received from smart phone 310 or IOT hub 312 that is transmitted to wireless device 100 in response to an advertising packet transmitted from wireless device 100 by RF SOC 102. Transmission of such an activation communication may be initiated by a local user (e.g., via direct connection from BLE-capable or Bluetooth Smart Ready cellphone 310 to wireless device 100), or from a remote user (e.g., via remote connection through Internet 302, AP 304 and BT bridge/s (IOT hub 312) to wireless device 100). Once wireless device 100 receives the wake up communication through BLE wireless protocol, RF SOC 102 switches back to WiFi wireless communication protocol by turning off components 124, 126 and 128 of BLE data communication path, and turning on components 134, 136 and 138 of WiFi data communication path under the control of application controller 122 in order to associate and connect to AP 304, after which it is ready for communication of motion video data or other real time or stored data from wireless device 100 through AP 304 to other local or remote device/s using relatively high data throughput WiFi communication protocol. In the case of wireless device 200 of FIG. 2, RF SOC 202 may reconfigure components 224, 226 and 228 of its internal bidirectional wireless data communication path from BLE to WiFi operation under the control of application controller 122. Thus, wireless device 100 or 200 may be each enabled with bidirectional wireless communication at all times that the wireless device is powered on in active or standby mode, i.e., a relatively high data throughput bidirectional WiFi wireless protocol communication operation may be selectively enabled during active operation mode of the wireless device 100 or 200 and then disabled while a different and relatively lower power consumption (e.g., BLE) bidirectional wireless protocol operation is enabled during a standby or other lower power operation mode of the wireless device 100 or 200.

Figure 5:
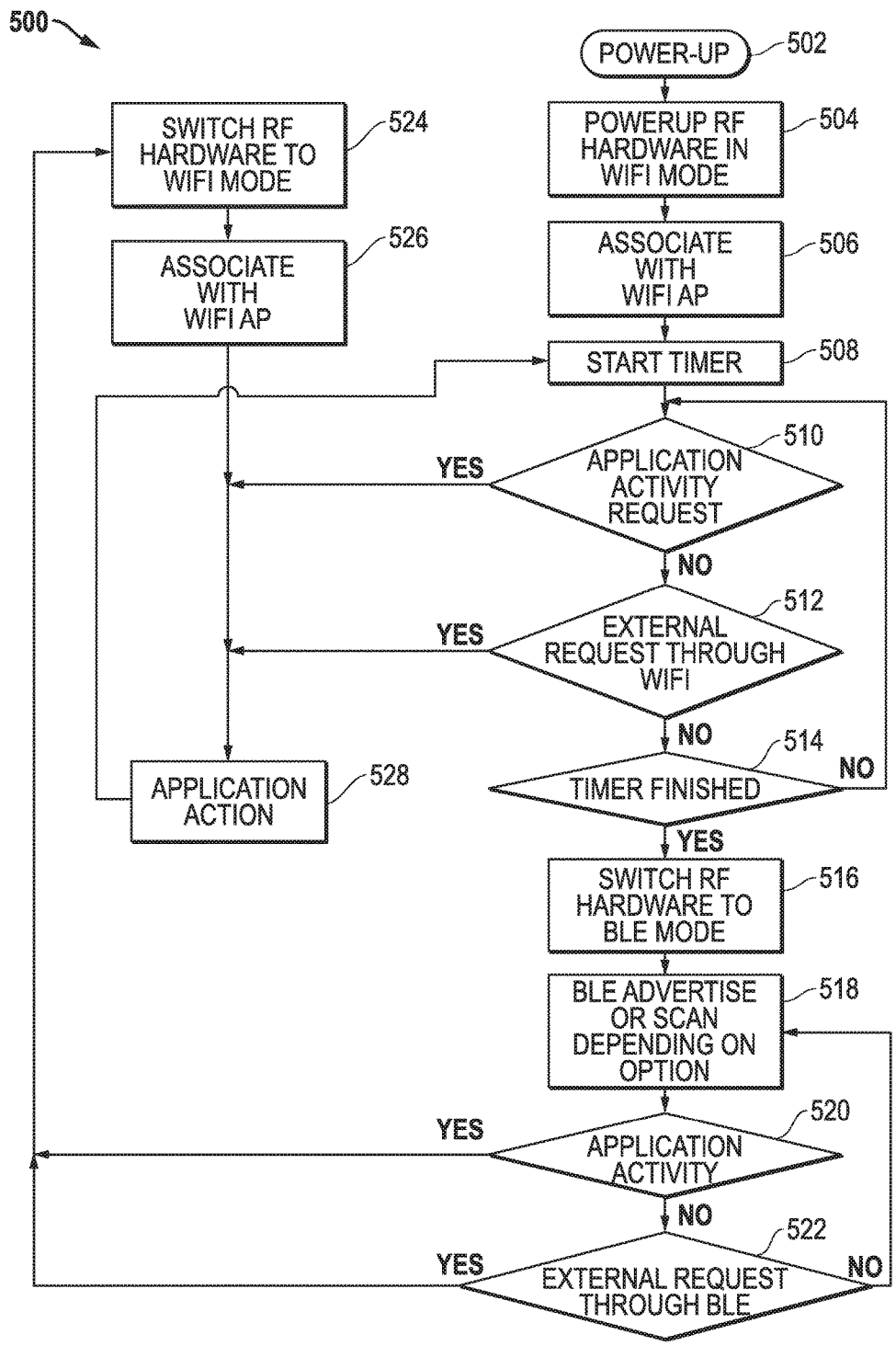
FIG. 5 illustrates methodology according to one exemplary embodiment of the disclosed circuitry and methods.

FIG. 5 illustrates one exemplary embodiment of methodology 500 that may be implemented by a battery-operated wireless device (e.g., using a RF SOC application controller 122 of wireless device 100 or 200) to change between a relatively higher power and data throughput WiFi wireless communication protocol and a relatively lower data throughput wireless protocol (e.g., such as BLE) in an on-demand manner based on a current power mode of the wireless device. In this regard, FIG. 5 will be described in relation to the exemplary wireless device 100 of FIG. 1 as it may be operating in the wireless communication environments of FIGS. 3 and 4. However, it will be understood that methodology 500 may be implemented in other wireless environments and/or by other configurations of battery-operated wireless devices including, but not limited to, wireless device 200 of the embodiment of FIG. 2.

As shown, methodology 500 starts in step 502 where the battery operated wireless device is powered up, e.g., by manipulation of a mechanical power switch by a local user. Methodology 500 then proceeds to step 504 where application controller 122 of RF SOC 102 activates WiFi wireless communication mode by activating components 134, 136 and 138 of bidirectional WiFi data communication path of wireless device 100. Once activated, application controller 122 uses WiFi communication to associate with WiFi AP 304 in step 506 and enter an active WiFi high data throughput mode such as illustrated in FIG. 3. In step 504, BLE data communication path components 124, 126 and 128 of wireless device 100 may remain powered off to save battery power. However, in an alternate embodiment, BLE data communication path components 124, 126 and 128 of wireless device 100 may be optionally powered up at the same time as components of WiFi data communication path, e.g., to allow battery-operated device 100 to simultaneous communicate using both WiFi and BLE wireless communication protocols.

Next, application controller 122 starts a WiFi mode timer in step 508 which will measure the duration of the current active WiFi operation mode since timer start against a defined time limit. In one embodiment, length of the WiFi mode time limit may be application-dependent, i.e., predetermined based on the particular characteristics or needs of a given application in which the wireless device 100 is operated. It will also be understood that for a given application, there are tradeoffs between setting the time limit length longer versus shorter. For example, setting too short of a time limit length may be undesirable when it causes the application to unnecessarily "ping-pong" or cycle back and forth between the higher power WiFi protocol and lower power BLE protocol, thus at least partially defeating the purpose of saving power due to multiple reconnections with the AP. On the other hand, setting too long of a time limit length may cause unnecessary battery drain by keeping the relatively high-power WiFi protocol active for more time than is needed for a given application. The most efficient or optimum range of time limit length values will vary according to the characteristics of a given application as will be described further herein.

Still referring to FIG. 5, methodology proceeds from step 508 to steps 510 and 512 where application controller 122 (e.g., which is executing at least one application that responds to and/or controls operation of one or more of input devices 108, 110 and/or 112) monitors for intermittent and/or periodic application activity requests and external WiFi activity requests, respectively. An internal application activity request may be generated periodically or intermittently by an application executing on application controller 122, for example, in response to one or more input signals 178, 180 and/or 182 received from respective input devices 108, 110 and/or 112 of FIG. 1. An external WiFi activity request may be generated, for example, by a local or remote user command received by wireless device 100 via AP 304, e.g., from remote computer 306 or one of local WiFi connected devices 310 or 308. Upon receipt of either an internal application activity request in step 510 or external WiFi activity request in step 512, application controller 122 responds in step 528 by taking a designated application action that corresponds to the internal application activity request or external WiFi activity request of steps 510 and/or 512. After this action is taken in step 528, then application controller restarts the timer (e.g., at time zero) in step 508 and steps 510 and 512 repeat as shown.

For example, in a case where input device 112 is a doorbell button at the entry door of a home, and camera 108 is a door-mounted camera that is positioned adjacent the doorbell, the application action in step 528 may be to control camera 108 to capture still image or motion image video of a visitor when the doorbell button is pressed by the visitor, and to control RF SOC 102 to transmit this still image or motion image video as output data via relatively higher data throughput WiFi wireless communication protocol through AP 304 to remote computer 306 and/or any of WiFi-connected devices 308 or 310 of FIG. 1 as requested or otherwise specified by the activity request. In the case of one exemplary doorbell application embodiment, the timer time limit length may be set or defined to be about 10 seconds, e.g., it is reasonable to assume that if no one presses the doorbell button within about 10 seconds after the image data transmission is ended, it will be much longer after that before the button is pressed by someone else. However, this 10 second time limit is exemplary only, and it will be understood that a selected time limit for step 508 may be greater than or less than 10 seconds in other embodiments, and may be depend on the nature of the given application and application activity request of step 528.

As long as no internal application activity request or external WiFi activity request is received in steps 510 and 512, then methodology 500 proceeds to step 514 where it is determined whether the duration of the active WiFi timer has reached the defined time limit and finished or expired. If not, then methodology 500 returns to steps 510 and 512 and repeats as shown. When it is determined in step 514 that the time duration of the active WiFi timer has met or exceeded the defined time limit, then methodology 500 proceeds to enable standby low data throughput mode of step 516, e.g., such as illustrated in FIG. 4. Specifically, in step 516 application controller 122 of RF SOC 102 may turn on BLE wireless communication mode by activating components 124, 126 and 128 of bidirectional BLE data communication path of wireless device 100, and also turn off the WiFi wireless communication mode by deactivating components 134, 136 and 138 of bidirectional WiFi data communication path of wireless device 100. Methodology 500 then proceeds to step 518 where application controller controls wireless device 100 to enter an advertising mode as the slave in a BLE connection or to become the master in a BLE connection and enter a scan mode.

In step 520, application controller 122 monitors for receipt of an internal application activity request in the same manner as described above for step 510, and monitors for an external activity request via BLE in step 522 as shown. An external BLE activity request may be received, for example, directly from a local BLE-capable wireless device such as smartphone 310 of FIG. 4, or from another local or remote device 306 or 308 via AP 304 and BLE IOT hub 312. Upon receipt of either an internal application activity request in step 520 or external BLE activity request in step 522, application controller 122 responds in step 524 by returning to active WiFi wireless communication mode in an on demand manner by activating components 134, 136 and 138 of the bidirectional WiFi data communication path of wireless device 100, and optionally deactivating components 124, 126 and 128 of the BLE data communication path. Methodology 500 then proceeds to step 526 where application controller 122 controls RF SOC 102 to associate with WiFi AP 304 and once again enter an active WiFi high data throughput mode such as illustrated in FIG. 3. Methodology 500 the proceeds to step 528 and takes a designated application action that corresponds to the application activity request or external BLE activity request of steps 520 and/or 522 in a manner as previously described for step 528. Once again, when this action is taken in step 528, then application controller restarts the timer in step 508 and repeats to steps 510 and 512 as shown.

It will be understood that methodology 500 is exemplary only, and that any other combination of additional, fewer, and/or alternative steps may be employed that is suitable for selectively enabling and disabling operation of relatively higher data throughput and higher power WiFi wireless protocol on demand to meet the data transmission needs for a requested application activity, and also enabling operation of a relatively lower data throughput and lower power second wireless protocol while the WiFi wireless protocol is disabled to ensure that the battery-operated wireless device maintains bidirectional wireless communication capability for receiving and acting in response to activity commands or other communications from other external wireless devices when the WiFi wireless protocol is disabled.

It will also be understood that one or more of the tasks, functions, or methodologies described herein (e.g., including those described herein for application controller 122) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processor such as central processing unit "CPU", controller, microcontroller, microprocessor, application specific integrated circuit "ASIC" or executed on a programmable logic device "PLD" such as field programmable gate array "FPGA", complex programmable logic device "CPLD", etc.) to perform one or more steps of the methodologies disclosed herein. In one embodiment, a group of such processors and PLDs may be processing devices selected from the group consisting of CPU, controller, microcontroller, microprocessor, FPGA, CPLD and ASIC. In some embodiments, a computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

Further, while the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A system, comprising at least one first wireless device communicating with a second and different wireless device across a bidirectional IEEE 802.11-based WiFi first wireless communication protocol, the first wireless device comprising:
   at least one antenna;
   at least one bidirectional wireless data communication path coupled to the antenna; and
   at least one processor or programmable logic device (PLD) coupled to provide output data to the at least one bidirectional wireless data communication path, the at least one processor or PLD being configured to:
   execute at least one application to perform at least one intermittent or periodic activity to produce the output data,
   selectively enable the bidirectional IEEE 802.11-based WiFi first wireless communication protocol to transmit the produced output data from the first wireless device and through the second wireless device to one or more external wireless devices using the WiFi first wireless communication protocol, and
   then selectively disable the WiFi first wireless communication protocol after transmitting the produced output data while using a second and different bidirectional wireless communication protocol that consumes relatively less operating power than does the WiFi first wireless communication protocol to communicate with one or more external wireless devices while the WiFi first wireless communication protocol is disabled;
   where the second and different bidirectional wireless communication protocol is a Bluetooth Low Energy (BLE) wireless communication protocol;
   where the processor or PLD of the first wireless device is further configured to selectively disable the second and different bidirectional wireless communication protocol at any time the WiFi first wireless communication protocol is enabled, and is configured to selectively enable the second and different bidirectional wireless communication protocol at any time the WiFi first wireless communication protocol is disabled;
   where the processor or PLD of the first wireless device is further configured to receive an external activity request through the second wireless device via the WiFi first wireless communication protocol or receive a first internal application activity request while the WiFi first wireless communication protocol is enabled, and to respond to the received WiFi external activity request or the first internal application activity request by performing at least one designated activity to produce and transmit the output data to one or more external wireless devices through the second wireless device using the WiFi first wireless communication protocol; and
   where the processor or PLD of the first wireless device is further configured to receive an external activity request via the second wireless communication protocol or receive a second internal application activity request while the second wireless communication protocol is enabled and while the WiFi first wireless communication protocol is disabled, and to respond to the received second wireless communication protocol external activity request or the second internal application activity request by first enabling the WiFi first wireless communication protocol and then performing at least one designated activity to produce and transmit the output data through the second wireless device to one or more external wireless devices using the WiFi first wireless communication protocol.

2. The system of claim 1, further comprising one or more input devices coupled to provide an input signal by wired conductor to the processor or PLD of the first wireless device; and where the processor or PLD of the first wireless device is configured to execute at least one application to receive the input signal from the one or more input devices and to produce the output data based the received input signal.

3. The system of claim 2, where the input devices comprise at least one of a video camera, environmental or condition sensor, user interface device, or a combination thereof.

4. The system of claim 2, where the antenna, bidirectional wireless data communication path, processor or PLD, and one or more input devices of the first wireless device are integrated together as part of a single self-contained battery-operated device.

5. The system of claim 1, where the processor or PLD of the first wireless device is further configured to execute a timer to measure a duration of time that the WiFi first wireless communication protocol has been continuously enabled since the timer was last started, and then to disable the WiFi first wireless communication protocol when the duration of the timer equals a defined time limit; and where the processor or PLD of the first wireless device is further configured to restart the timer each time the at least one application is executed to perform the intermittent or periodic activity to produce the output data.

6. The system of claim 1, where the second wireless device is a wireless access point bidirectionally communicating with one or more local external wireless devices in the same wireless local area network (WLAN); and where the at least one processor or programmable logic device (PLD) of the first wireless device is further configured to selectively enable the bidirectional IEEE 802.11-based WiFi first wireless communication protocol to transmit the produced output data from the first wireless device through the second wireless device and to the one or more local external wireless devices in the same wireless local area network (WLAN) using the WiFi first wireless communication protocol.

7. The system of claim 1, where the second wireless device is a wireless access point bidirectionally communicating across the Internet with one or more remote external wireless devices; and where the at least one processor or programmable logic device (PLD) of the first wireless device is further configured to selectively enable the bidirectional IEEE 802.11-based WiFi first wireless communication protocol to transmit the produced output data from the first wireless device through the second wireless device and across the Internet to the one or more remote external wireless devices.

8. The system of claim 1, further comprising a different and third wireless device communicating with the first wireless device across the second wireless communication protocol to provide the second wireless communication protocol external activity request to the first wireless device; and where the processor or PLD of the first wireless device is further configured to receive the second wireless communication protocol external activity request via the second wireless communication protocol while the second wireless communication protocol is enabled and while the WiFi first wireless communication protocol is disabled, and to respond to the received second wireless communication protocol external activity request from the third wireless device by first enabling the WiFi first wireless communication protocol and then performing at least one designated activity to produce and transmit the output data through the second wireless device to one or more external wireless devices using the WiFi first wireless communication protocol.

9. The system of claim 8, where the third wireless device is a smart phone or Internet-of-Things (TOT) hub communicating with the first wireless device using the second wireless communication protocol, and communicating with the second wireless device using the WiFi first wireless communication protocol.

10. The system of claim 8, where the third wireless device is a device communicating with the first wireless device using the second wireless communication protocol, and communicating with the second wireless device using the WiFi first wireless communication protocol; and where the processor or PLD of the first wireless device is further configured to selectively enable the second wireless communication protocol to bidirectionally communicate data with the third wireless device, and through the third wireless device to the one or more external devices using the WiFi first wireless communication protocol.

11. A method, comprising using at least one processor or programmable logic device (PLD) of a first wireless device to:
execute at least one application to perform at least one intermittent or periodic activity to produce output data;
selectively enable a bidirectional IEEE 802.11-based WiFi first wireless communication protocol to transmit the produced output data from the first wireless device and through a second and different wireless device to one or more external wireless devices using the WiFi first wireless communication protocol; and
then selectively disable the WiFi first wireless communication protocol after transmitting the produced output data while using a second and different bidirectional wireless communication protocol that consumes relatively less operating power than does the WiFi first wireless communication protocol to communicate from the first wireless device with one or more external wireless devices while the WiFi first wireless communication protocol is disabled;
where the second and different bidirectional wireless communication protocol is a Bluetooth Low Energy (BLE) wireless communication protocol; and
where the method further comprises using the processor or PLD of the first wireless device to:
selectively disable the second and different bidirectional wireless communication protocol at any time the WiFi first wireless communication protocol is enabled, and is configured to selectively enable the second and different bidirectional wireless communication protocol at any time the WiFi first wireless communication protocol is disabled;
receive an external activity request through the second wireless device via the WiFi first wireless communication protocol or receive a first internal application activity request while the WiFi first wireless communication protocol is enabled, and to respond to the received WiFi external activity request or the first internal application activity request by performing at least one designated activity to produce and transmit the output data to one or more external wireless devices through the second wireless device using the WiFi first wireless communication protocol; and
receive an external activity request via the second wireless communication protocol or receive a second internal application activity request while the second wireless communication protocol is enabled and while the WiFi first wireless communication protocol is disabled, and to respond to the received second wireless communication protocol external activity request or the second internal application activity request by first enabling the WiFi first wireless communication protocol and then performing at least one designated activity to produce and transmit the output data through the second wireless device to one or more external wireless devices using the WiFi first wireless communication protocol.

12. The method of claim 11, further comprising using the processor or PLD of the first wireless device to execute at least one application to receive an input signal across a wired conductor from one or more input devices and to produce the output data based the received input signal.

13. The method of claim 12, where the input devices comprise at least one of a video camera, environmental or condition sensor, user interface device, or a combination thereof.

14. The method of claim 11, further comprising using the processor or PLD of the first wireless device to execute a timer to measure a duration of time that the WiFi first wireless communication protocol has been continuously enabled since the timer is last started, and then to disable the WiFi first wireless communication protocol when the duration of the timer equals a defined time limit; and further comprising using the processor or PLD of the first wireless device to restart the timer each time the at least one application is executed to perform the intermittent or periodic activity to produce the output data.

15. The method of claim 11, where the second wireless device is a wireless access point bidirectionally communicating with one or more local external wireless devices in the same wireless local area network (WLAN); and where method further comprises using the at least one processor or programmable logic device (PLD) of the first wireless device to selectively enable the bidirectional IEEE 802.11-based WiFi first wireless communication protocol to transmit the produced output data from the first wireless device through the second wireless device and to the one or more local external wireless devices in the same wireless local area network (WLAN) using the WiFi first wireless communication protocol.

16. The method of claim 11, where the second wireless device is a wireless access point bidirectionally communicating across the Internet with one or more remote external wireless devices; and where the method further comprises using the at least one processor or programmable logic device (PLD) of the first wireless device to selectively enable the bidirectional IEEE 802.11-based WiFi first wireless communication protocol to transmit the produced output data from the first wireless device through the second wireless device and across the Internet to the one or more remote external wireless devices.

17. The method of claim 11, further comprising using the processor or PLD of the first wireless device to:
receive the second wireless communication protocol external activity request from a different and third wireless device via the second wireless communication protocol while the second wireless communication protocol is enabled and while the WiFi first wireless communication protocol is disabled; and
respond to the received second wireless communication protocol external activity request from the third wireless device by first enabling the WiFi first wireless communication protocol and then performing at least one designated activity to produce and transmit the output data through the second wireless device to one or more external wireless devices using the WiFi first wireless communication protocol.

18. The method of claim 17, where the third wireless device is a smart phone or Internet-of-Things (TOT) hub communicating with the first wireless device using the second wireless communication protocol, and communicating with the second wireless device using the WiFi first wireless communication protocol.

19. The method of claim 17, further comprising:
using the third wireless device to communicate with the first wireless device using the second wireless communication protocol, and to communicate with the second wireless device using the WiFi first wireless communication protocol; and
using the processor or PLD of the first wireless device to selectively enable the second wireless communication protocol to bidirectionally communicate data with the third wireless device, and through the third wireless device to the one or more external devices using the WiFi first wireless communication protocol.

20. A single-die integrated circuit, comprising:
at least one bidirectional wireless data communication path configured to be coupled to at least one antenna; and
at least one processor or programmable logic device (PLD) coupled to provide output data to the at least one bidirectional wireless data communication path, the at least one processor or PLD being configured to:
execute at least one application to perform at least one intermittent or periodic activity to produce the output data,
selectively enable a bidirectional IEEE 802.11-based WiFi first wireless communication protocol to provide the produced output data to the antenna for transmission to one or more external wireless devices through an intermediary wireless device, and
then selectively disable the WiFi first wireless communication protocol while using a second and different bidirectional wireless communication protocol that consumes relatively less operating power than does the WiFi first wireless communication protocol to provide data to the antenna and receive data from the antenna while the WiFi first wireless communication protocol is disabled;
where the second and different bidirectional wireless communication protocol is a Bluetooth Low Energy (BLE) wireless communication protocol;
where the processor or PLD is further configured to selectively disable the second and different bidirectional wireless communication protocol at any time the WiFi first wireless communication protocol is enabled, and is configured to selectively enable the second and different bidirectional wireless communication protocol at any time the Wi Fi first wireless communication protocol is disabled;
where the processor or PLD is further configured to receive an external activity request through the intermediary wireless device via the WiFi first wireless communication protocol or receive a first internal application activity request while the WiFi first wireless communication protocol is enabled, and to respond to the received WiFi external activity request or the first internal application activity request by performing at least one designated activity to produce and transmit the output data to one or more external wireless devices through the intermediary wireless device using the WiFi first wireless communication protocol; and
where the processor or PLD is further configured to receive an external activity request via the second wireless communication protocol or receive a second internal application activity request while the second wireless communication protocol is enabled and while the WiFi first wireless communication protocol is disabled, and to respond to the received second wireless communication protocol external activity request or the second internal application activity request by first enabling the WiFi first wireless communication protocol and then performing at least one designated activity to produce and transmit the output data through the intermediary wireless device to one or more external wireless devices using the WiFi first wireless communication protocol.

21. The integrated circuit of claim 20, where the processor or PLD is further configured to execute a timer to measure a duration of time that the WiFi first wireless communication protocol has been continuously enabled since the timer was last started, and then to disable the WiFi first wireless communication protocol when the duration of the timer equals a defined time limit; and where the processor or PLD is further configured to restart the timer each time the at least one application is executed to perform the intermittent or periodic activity to produce the output data.

* * * * *

UNITED STATES PATENT AND TRADEMARK OFFICE
CERTIFICATE OF CORRECTION

PATENT NO. : 10,165,516 B2  
APPLICATION NO. : 15/196523  
DATED : December 25, 2018  
INVENTOR(S) : Pereira Page 1 of 1

It is certified that error appears in the above-identified patent and that said Letters Patent is hereby corrected as shown below:

In the Claims

In Claim 9, Column 15, Line 66, delete "(TOT)" and insert -- (IOT) --

In Claim 18, Column 17, Line 66, delete "(TOT)" and insert -- (IOT) --

Signed and Sealed this  
Eleventh Day of June, 2019

Andrei Iancu  
*Director of the United States Patent and Trademark Office*